United States Patent [19] [11] 3,804,978
Lemelson [45] Apr. 16, 1974

[54] INFORMATION STORAGE AND REPRODUCTION SYSTEM HAVING VERTICAL SYNCHRONIZING SIGNAL INDEPENDENT HORIZONTAL SCANNING FREQUENCY

[76] Inventor: Jerome H. Lemelson, 85 Rector St., Metuchen, N.J. 08840

[22] Filed: July 22, 1968

[21] Appl. No.: 746,504

Related U.S. Application Data

[63] Continuation of Ser. No. 347,999, Feb. 26, 1964, which is a continuation-in-part of Ser. No. 765,401, Oct. 6, 1958.

[52] U.S. Cl. .................. 178/6.8, 178/6.7, 178/6.7 A, 178/DIG. 28

[51] Int. Cl. .......................... H04n 5/88, H04n 7/18

[58] Field of Search ............ 178/6.7 A, DIG. 28, 6.8

[56] References Cited

UNITED STATES PATENTS

| | | | |
|---|---|---|---|
| 2,531,974 | 11/1950 | Ellett | 178/7.2 D |
| 2,818,466 | 12/1957 | Larson | 178/6.7 A |
| 2,912,487 | 11/1959 | Horsley | 178/7.2 D |
| 3,333,058 | 7/1967 | Goldmark | 178/6.7 A |

OTHER PUBLICATIONS

Knoll and Kazan. Storage Tubes New York, John Wiley & Sons, Inc., pages 78–81

*Primary Examiner*—Howard W. Britton
*Attorney, Agent, or Firm*—Ostrolenk, Faber, Gerb & Soffen

[57] ABSTRACT

An elongated film record has a sequence of picture frames and synchronizing indicia for the frames. The film record is transported through a scanning beam which passes through the record to a detector. The scanning beam is driven by a horizontal signal generator which scans the picture frames and synchronizing indicia with the detector developing a first signal representative of the information in the frames, and a vertical synchronizing signal at a frequency related to the rate of movement of the synchronizing indicia, but independent of the frequency of the horizontal signal generator.

13 Claims, 14 Drawing Figures

PATENTED APR 16 1974 3,804,978

SHEET 1 OF 7

INVENTOR.
Jerome H. Lemelson

BY

Ostrolenk, Faber, Gerb & Soffen

ATTORNEYS

INVENTOR.
JEROME H. LEMELSON
BY
OSTROLENK, FABER, GERB & SOFFEN
ATTORNEYS

INVENTOR.
Jerome H. Lemelson
BY
Ostrolenk, Faber, Gerb & Soffen
ATTORNEYS

INVENTOR.
Jerome H. Lemelson
BY
Ostrolenk, Faber, Gerb & Soffen
ATTORNEYS

INVENTOR.
Jerome H. Lemelson
BY
OSTROLENK, FABER, GERB & SOFFEN
ATTORNEYS

INVENTOR.
Jerome H. Lemelson
BY
OSTROLENK, FABER, GERB & SOFFEN
ATTORNEYS

INVENTOR.
Jerome H. Lemelson
BY
Ostrolenk, Faber, Gerb & Soffen
ATTORNEYS

INFORMATION STORAGE AND REPRODUCTION SYSTEM HAVING VERTICAL SYNCHRONIZING SIGNAL INDEPENDENT HORIZONTAL SCANNING FREQUENCY

This application is a continuation of my copending application Ser. No. 347,999, filed Feb. 26, 1964, entitled "Information Storage and Reproduction System," now abandoned, which was a continuation-in-part of application Ser. No. 765,401, filed Oct. 6, 1958, entitled "Information Storage and Reproduction System," and now abandoned.

This invention relates to information storage apparatus and, in particular, to an information storage system employing a continuously and/or intermittently movable conveyor for image frames and apparatus for selectively reproducing images of said frames.

In accordance with the present invention, the frames of an elongated recording medium are provided with respective scan marks which provides a signal output whenever a mark appears in the scanning field of the reproducing apparatus. This output signal is then used to trigger a vertical sync signal generator to provide correct vertical synchronization without requiring complicated synchronizing equipment for producing the conventional and interrelated horizontal and vertical sweep signals in a fixed ratio. That is, the apparatus of the present invention operates with a random line scan in which the horizontal sweep frequency is not tied to the vertical reproduction frequency of a receiver.

Accordingly, the main object of the invention claimed in the present application is to provide means for synchronizing the deflection of the scanning beam of a video camera with the movement of a plurality of image frames through the scanning field of said camera whereby said beam starts its scanning movement from a predetermined position in its field as a new frame enters said field and the cyclic frequency thereof is controlled by the movement of frames through said scanning field.

The invention, its objects and advantages, will be more fully understood from the following description when read in connection with the accompanying drawings in which.

Certain assumptions are hereinafter made pertaining to the circuits of the drawings forming a part of this invention in order to present them in as simple a form as is possible. It is assumed, for example, that the correct power supplies are provided on the correct side of all switches and controls as well as connected to all amplifiers, receivers, coded relays, signal generators, storage tubes and the like, regardless of whether or not said power supplies are shown. Drives referred to for operating tape transports and switches are assumed to contain all the necessary controls and components according to the teachings of the art. Monitors comprising image retention screens or tubes may be provided in accordance with the teachings of the art or in accordance with those of my copending patent applications. The division of all circuits into two or more circuits are assumed to be effected by known junction techniques or by means of the proper transformers. Automatic switching systems are provided in accordance with systems of this type known in the art. Video camera and receiver deflection controls similarly are in accordance with those known in the art.

Figure 1:
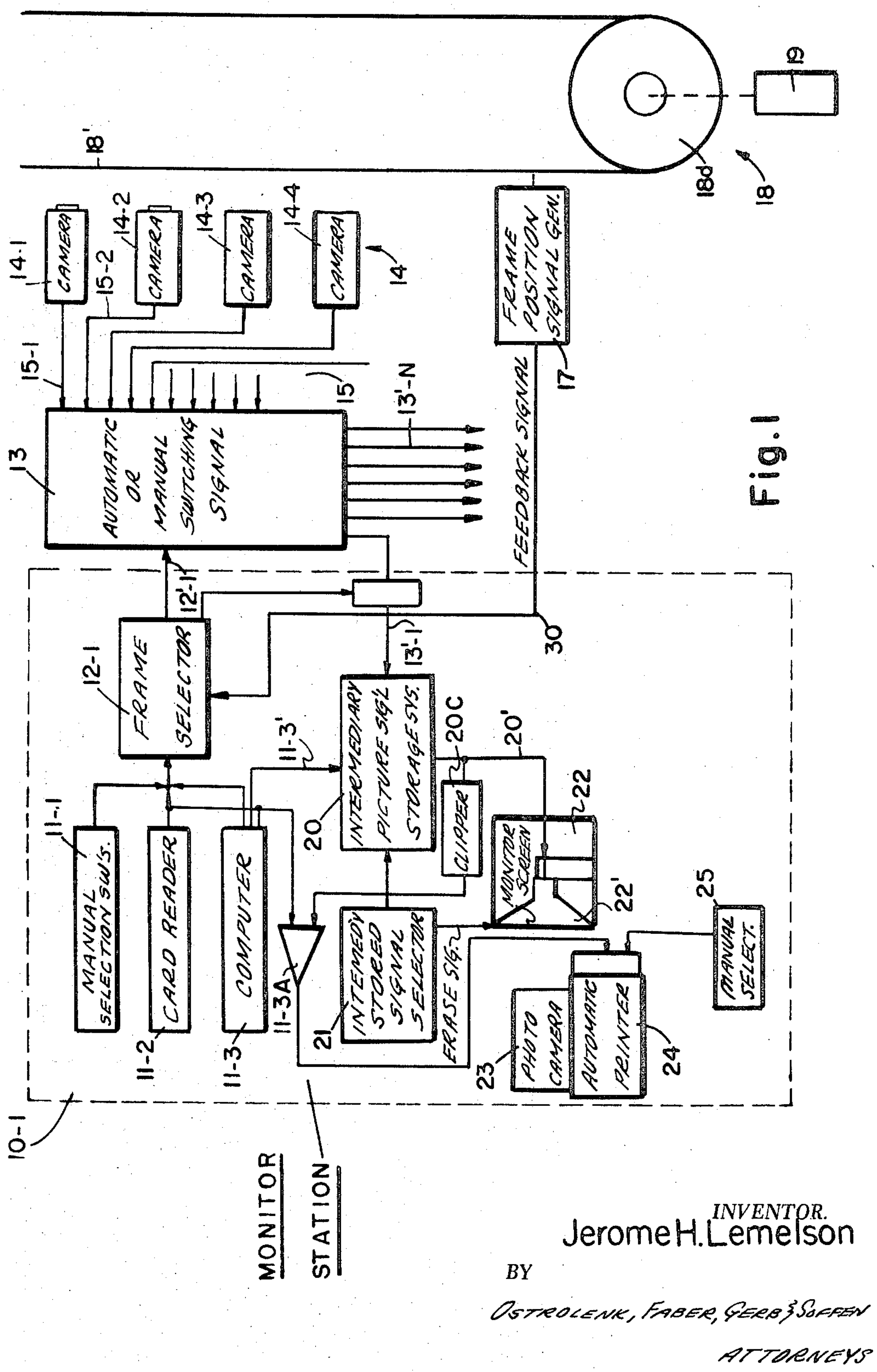
FIG. 1 is a block diagram of the general image storage and retrieval system.

Referring first to the block diagram designated FIG. 1, the illustrated information storage system comprises a master information storage conveyor 18 having a belt 18'; scanning cameras 14 mounted off said conveyor for scanning its surface and frames of image information provided thereon, a switching system 13 for gating resulting picture signals from a selected camera to one or more of a plurality of receiving stations 10, each of which preferably has associated therewith signal storage and/or monitoring means. The information is stored in the form of recorded areas of belt 18' as frames of documents or picture images which may be developed in photographic film, or printed on photosensitive paper, or the like. Said frames are mounted or provided in any suitable manner on the conveyor belt 18 and are preferably arranged in a plurality of aligned columns so that scanning of selected frames and the reproduction of picture signals at the monitor stations may be effected rapidly and without difficulty.

Whereas the cameras 14 may comprise any of a variety of designs of video scanning devices available for providing picture signal outputs of a scanned image field, a small video scanning camera which is available at this writing and measures but a few square inches in lateral cross-section is a miniaturized Vidicon scanning tube camera manufactured by several companies including Radio Corporation of America and Westinghouse Corp. These may be mounted in any suitable array just off the surface of the conveyor belt 18' in a manner to scan said predetermined record containing strip areas or columns of said document recordings. The term "conveyor belt" as hereafter utilized, defines any flexible mounting for said image frames which is capable of being driven in a so-called endless path or closed loop and may comprise a flexible web or a series of tandemly arranged rigid platens or flights which are pinned to each other or mounted on a chain so that they may be driven in a closed loop. The closed loop belt may also be replaced by an open loop device or an elongated rigid platen which is power driven in the manner to be described for the belt past said scanners 14 by means of a motor and drive means 19 which may be any suitable constant speed or intermittent powered motion producing device.

The scanners 14-1, 14-2, 14-3, 14-4, etc. are shown mounted in rows extending laterally across the conveyor in sufficient number and positioned such that each of said columns of image frames is scanned by at least one of said cameras. Other arrangements may be provided whereby two or more cameras scan the same column or conveyor strip from different locations along the belt or conveyor. If the conveyor is run continuously, the picture signal output of the camera or scanner closest to the desired image frame may be selected for performing scanning functions so that there will not be a substantially long wait to retrieve said information.

As stated, a plurality of monitor stations are provided, each operative by a different individual for viewing reproductions of selected images provided on the storage conveyor 18 or for otherwise utilizing the signals reproduced therefrom, such as for computer or documentation, or printing use. The illustrated monitor station 10 is provided with a viewing device such as a conventional video receiver 22 containing a picture tube 22' such as an image storage tube and the necessary signal amplifying and beam deflection control means for providing a still image on the face of said storage tube as the result of the receipt thereby of a selected picture signal which has been generated by a selected of the scanning cameras 14. Selection of a desired document picture signal or signals and the automatic transmission thereof when it is generated on the output of a selected camera in said system, is effected by means of a frame selector 12-1 which has a command-input from a bank of manual selection switches 11-1, a punched card reader 11-2, or a computer or other device 11-3. The frame selector 12-1 comprises, in its simplest form, a rotary selection switch with inputs from each of said cameras and a single output which extends either to said monitor device for single frame selection or to an intermediary picture signal recorder 20. In many literature or data searching functions, it is required to reproduce not one but a plurality of images of document pages recorded in succession. If the system utilizes as in FIG. 1 a long conveyor belt 18' which is in continuous movement, and it is desired to scan or visually monitor the material contained in a series of image frames, it will be to the advantage of the operator of the monitor apparatus to temporarily store said plural images in a manner such that they may be selectively reproduced thereafter by the operator without having to wait for the belt to recycle or the next frame to pass the selected camera.

The frame selector is connected to the automatic switching system 13 by means of an output line 12'-1 and the intermediate picture signal storage system 20 receives picture signals from said switching system over the selected one of the plurality of output lines 13'. For indicating which portion of the belt 18' of conveyor 18 is passing the cameras, a frame position signal generator 17 is provided which generates a feedback signal or code signals to the frame selection means 12, which code is utilized to close and open a switch or gate 13'g in the input line 13'1 at predetermined times during a cycle of operation such that only selected picture signals pass to the intermediary storage system 20 and are stored therein. The operation of the intermediary storage system by means of a further selection means 21 may be effected manually by the operator of the monitor station who selectively reproduces picture signals stored therein one at a time and effects the writing of the respective images on the screen of the monitor tube 22' for viewing and monitoring purposes. The system, which includes sub-systems 20, 21 and 22, may be constructed and operated in accordance with one of the magnetic recording systems for recording and reproducing video image signals described and illustrated in my copending patent application Ser. No. 668,348, entitled "Magnetic Recording Systems" and filed on June 27, 1957, or any suitable erasable picture signal recording system. The notations 23, 24 and 25 refer respectively to apparatus for automatically printing, once energized, copies of the images appearing on the face of the monitor screen or tube 22' and includes an optical system or photographic camera 23, an automatic printer and hard copy processing machine 24 and a manual selector 25. When the latter is actuated by the person viewing or scanning the images appearing on the screen of 22', a controller such as a multi-circuit timer, automatically effects, by controlling the operations of servo motors and solenoids, the functions of photographing the face of 22' by control of the shutter of 23, and the developing and printing of the resulting exposed film or paper by operating the servo motor or motors, in the automatic printer 24 from which hard copy in the form of a print is derived for use as a permanent record. Such an automatic printing means may comprise the Copyflo machine made by the Haloid Company of Rochester, New York which photographs and prints copies of documents or flat sheets fed thereto. If the optical system of such a printer is adjusted to receive an image from the face of the monitor tube 22' and the apparatus is adapted to operate intermittently by means of a switch operated multi-circuit recycle timer of conventional design, then it may be used to photograph and print selected images appearing on the screen of 22' of FIG. 1. If said manual switch is replaced by a solenoid operated switch and the energizing input to said solenoid is derived from a computer or reader, such as 11-2 or 11-3, then the function of printing hard copies of the images reproduced from the conveyor 18 by video scanning may be effected automatically by energizing the controller of 24. If the control device 11-3 is a card-reader or other type of program controller, it is preferably programmed to generate signals in the proper sequence to effect the cyclic operation of the automatic camera and printer when an image is generated on the face of the screen of 22'. This is effected in one manner by clipping the frame vertical sync pulse from the video picture signal transmitted from the intermediate storage system 20 by means of a differentiator clipper 20C and passing the resulting pulse signal to one input of a local AND switching circuit 11-3A in the line 11-3' having its other input energized with a constant signal derived from the signal generating controller or reader 11-3. When both inputs to 11-3A are simultaneously energized, its output becomes energized which is utilized to energize the controller for the camera printer 23, 24. The controller 11-3A may also be a binary counter relay adapted to produce a pulse on its output after receiving two pulses on its input, with said input being connected to the output of both 11-3 and 20C. A system of this type utilizing both manual selection and automatic selection and printing means as described is quite versatile and capable of automatic data and document reproduction and transmission. A signal reproduced from the intermediary storage signal system 20 may also be utilized to effect the automatic operation of the automatic printing apparatus.

In another form of the invention, the recording image frame mount or conveyor belt 18' is driven intermittently by a stepping motor 19 which is coupled to and rotates the sprocket of drum 18*d* of the conveyor 18. The drive means and locations of the rows of frames or pictures provided on or in 18' are such that, each time the conveyor comes to rest, individual frames thereof will be centered in the scanning fields of a camera and will remain therein for sufficient time to permit the camera to scan the image field and produce a picture signal on its output line 15, which signal is that obtained during at least one frame sweep of the read beam. The next movement of the belt 18' is such that other frames provided on 18' will next be centered in the scanning field of the scanner 14. The movement is preferably such that when one image frame moves out of a scanning field of a camera, the next frame appearing in its column will be moved into and will center in the scanning field of the same camera during the next cycle and said scanning cycle will be repeated for said next frame. In this system of image storage and reproduction, a different still image picture signal will be developed on the output circuit of each camera each time the conveyor 18 is stopped and selection means are provided in the form of a frame selector to perform the dual functions of effecting the correct connection between the monitor station and a predetermined camera and that of gating only predetermined picture signals, produced on the output of the selected camera, to the intermediate storage system 20 in use. A system of this type is operative to permit the output of any camera in the system to be simultaneously passed to a plurality of monitor stations. If two of said monitor stations 10 simultaneously require that the same information or picture signal be received and recorded, it is not necessary for the operator at one monitor station to await the completion of the same scanning operation of another operator. Furthermore, complex control of each camera by remote means is not necessary.

The conveyor 18 may be mounted with its belt or hinged flights 18' extending horizontally, vertically or in a combination of directions or series of reversing loops to provide the maximum length thereof in a minimum cubic volume. The frame supporting the conveyor 18 is used to support the scanning cameras 14, power lines extending thereto and also supports coaxial cable utilized for picture signal transmission. The cameras 14 may be arranged in rows extending across the conveyor, each adapted to scan a respective column of image frames which pass through its scanning field. A single frame position indicator 17 may be provided to scan position indicating marks or codes on a channel or band area of the belt 18' for indicating the position of said conveyor and the frames thereon in relation to the cameras. A frame position indicator scanner 17 may also be provided for each bank of cameras. The necessity of providing plural banks of scanners 17 will depend on the precision in which the image frames are mounted, and if the conveyor consists of a series of flights or platens hinged together, the degree of backlash thereof.

The system of FIG. 1 is also applicable to storage and reproduction functions other than deriving selected frames of image information. The conveyor 18 may contain on its belt section 18' a plurality of objects or articles such as products or manufactured items in process. The cameras may be positioned to scan normal to the surface of the conveyor or from the side thereof. The cameras 14 may be conventional video cameras adapted to provide a motion picture on the screen of the video monitor to which it is connected or a still picture of the object or article thereon which is generated in the same manner as if the camera were scanning an image frame or picture, as described hereafter. The system may be employed for the visual selection of one or more of a plurality of articles or products by one or more observers at remote locations or for the inspection of one or more articles or products at said remote locations. The switching system 13 may be a conventional automatic telephone switching system whereupon the conveyor 18 may contain individual articles or rows of different articles the image of which may be viewed by subscribers to the phone system on their respective monitor screens after a connection with one of the cameras 14 has been made by means to be described hereafter. The purchase or selection of a particular article may be effected by verbal order over the phone line or by means of a tone signal which is generated when the subscriber manually actuates a switch of a tone generator. A relay responsive to said tone and located near the conveyor 18 may be used to effect the removal of the article from the conveyor 18' by actuating a servo.

The computer or control device 11-3 is also shown connected to the input of the automatic printer 24, for effecting the automatic printing of predetermined of the image reproduction derived from scanning predetermined areas of the belt 18'. Since the computer 11-3 or the card reader may be utilized to automatically control the reproduction of signals from the intermediate storage system 20, it would be a relatively simple control function to effect the energization of the control for the automatic printer 24 by generating a signal on the input line 11-3' from 11-3 to 24 at or just after the signal is generated to energize the control for effecting the reproduction of the picture signal from the intermediate storage system 20.

One or more of a number of techniques for scanning the columns of image frame recordings to generate picture signals may be employed. Four systems are briefly described as follows:

In a first system, the image scanning means comprises a video scanning camera or flying spot scanner having a read beam adapted to continuously scan back and forth along a predetermined scanning line while the conveyor and column of image frames moves past said scanner at substantially constant speed such that the requested vertical deflection is provided by the image field in motion. The speed of the conveyor and the scanning rate of the beam is such that the resulting picture signal may be utilized to intensity modulate a so-called image write-tube or to provide a still image on its display face or screen. For such an arrangement, the beam of the scanner is automatically operative to return to a position where it again initiates scanning. During return sweep, the beam is in a condition of substantially zero potential to simulate the conventional line blanking function. The scanner may comprise a flying-spot scanner of the type described in the March, 1949 issue of the RCA REVIEW which provides a beam of light which scans at right angles to the direction of motion of the image column, the light being intensity-modulated after passing through the image recordings which are images developed in transparent film. A receiving tube such as a photo-multiplier tube is mounted to receive the modulated light from the scanner after it has passed through the image on the film. Said receiver is positioned on the other side of the film and provides a resulting modulated picture signal output. The picture signal is produced as the result of the modulation of the light from the flying-spot scanner as it passes through areas of different density of the film. The resulting picture signal output is passed to the monitor station which is connected to the scanner and only those portions of the video picture signal so generated which pertain to selected image frames in the selected record column are gated to an intermediary storage means of a monitor station for playback through devices such as the video receiver thereof. The blanking portions of the video signal defining the interval between consecutive frames is produced by providing areas between each stored image frame which are black in nature so as to produce a video signal simulating the so-called blanking or black signal portion of the picture signal. For such a system, the frame sync signal or vertical sync signal is not required, since the vertical motion is attained by the movement of the film and the flying-spot scanner merely sweeps its beam back and forth across the film at a constant rate as the film moves at constant speed. If a vertical sync signal is required for reproducing the information derived by scanning a single frame said sync signal may be derived from scanning the markings or code at the edge or margin of the conveyor.

A second system employs intermittent movement of the camera in the same direction that the column of image information is moving and in a manner such that said camera will travel at substantially the same speed as the document recording to be scanned, whereby the recording is stationary in the scanning field for a period of time sufficient to permit the camera to scan by conventional means the selected image frame.

A third means applicable for scanning includes intermittently moving the conveyor carrying information recordings in a manner such that one frame is conveyed at a time into the scanning field of a conventional video scanning camera and remains there for a sufficient period of time to permit at least one screen sweep of the camera scanning beam. Thereafter, the document recording is conveyed out of the scanning field image field a degree so as to position the next image frame to be centered in said camera scanning field.

In another system individual image frames or document recordings are each provided on an intermittently fed base or card. Strips or groups of said frames pertaining to a particular subject may also be provided on a single card or platen which is one of a plurality of said cards. If the card bases are punched cards provided with conventional automatic selection and coding means they may be selectively or continuously fed through the scanning fields of said scanning cameras in a continuous movement to provide individual frames or rows of said frames of images on a card in the scanning fields of respective cameras in the same manner hereinabove described for the belt or conveyor 18' save that the driving or feed means for said cards is modified in accordance with the spacing of the frames. Card selection, control of movement into and out of the scanning fields is preferably provided by known card feeding apparatus. By providing said image frames mounted on a plurality of plates, flights or cards which are individually handled and continuously or intermittently moved into and out of the scanning fields of said rows of cameras, the changing of image frames or addition thereto may be easily effected without the necessity of stopping said feeding function by employing known card sorting apparatus. The conveyor 18 may serve as a means for conveying said document recording cards or plates into and out of said scanning fields of said cameras.

Figure 2:
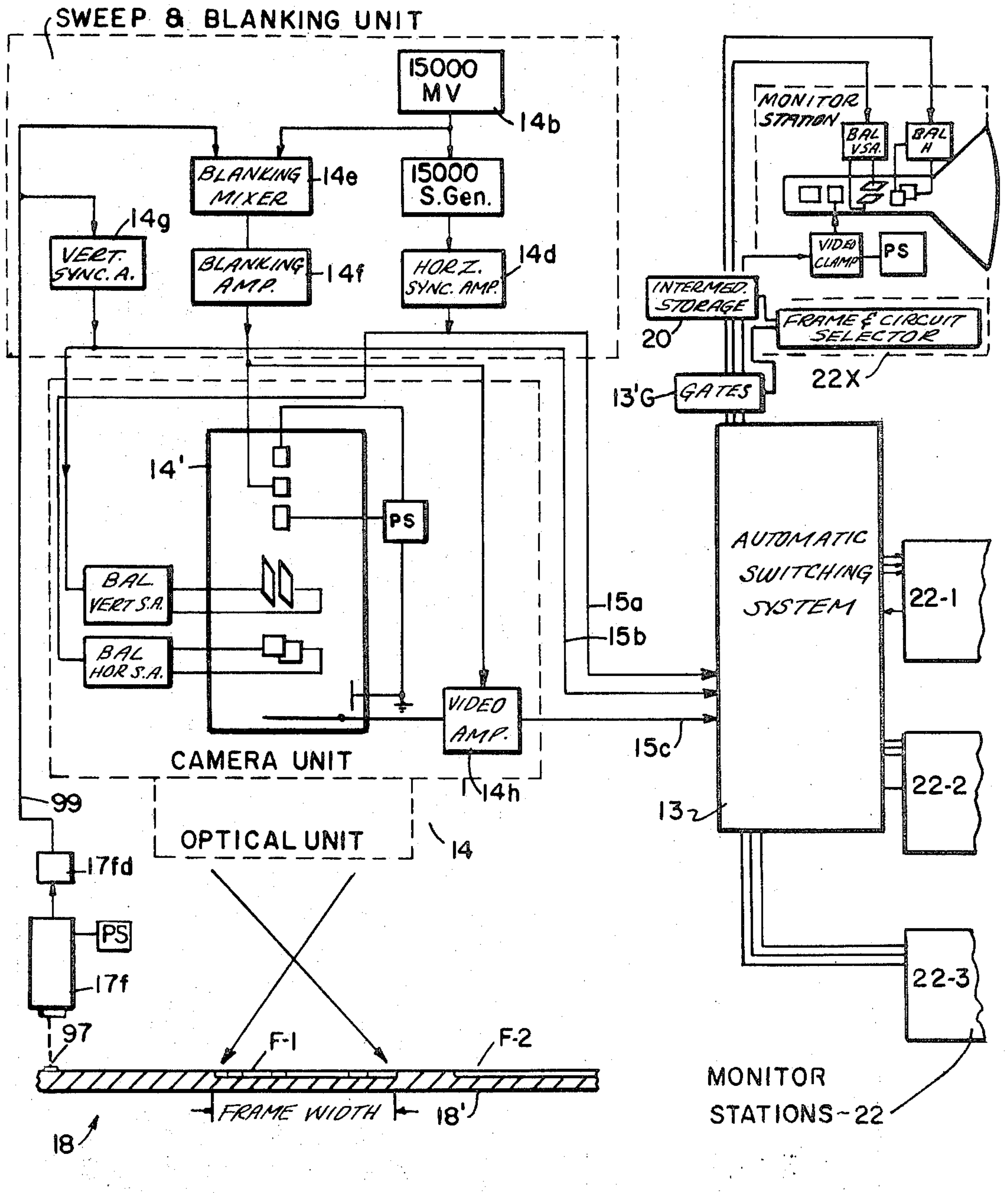
FIG. 2 is a diagram showing details of the control means for a video scanner as utilized in FIG. 1.

FIG. 2 illustrates one form of scanning beam control utilizing a conventional video camera modified to scan each image frame only when positioned in the scanning field thereof with a line frequency of 15 kilocycles which may be increased if necessary by replacement of the multivibrators. The generated picture signal comprises that generated during a single frame sweep of the camera read beam and results from a beam sweep which starts at a known point in the image field and terminates at or near said point. Rows of said cameras may be laterally positioned and arranged relative to each other and the image frame conveyor, such that each image frame track moving past said scanners will be scanned by at least one of said cameras. The camera optical system 14*a* is provided such that an image approximately equal to the film, print or microphotograph positioned in front of said optical system will occupy substantially the scanning field of a conventional image tube 14' such as a Vidicon tube, or the like. The camera is provided with the conventional beam deflection and blanking controls 14'' which receive sync signals from amplifiers 14*g*, 14*f*, 14*d*. The blanking amplifier 14*f* receives blanking signals from a blanking mixer 14*b* and the output of an image frame position indicator 17*f*. The frame indicator 17*f* comprises a relay such as a photo-electric scanning unit adapted to become energized and to provide a signal output when it scans a mark on the surface of conveying means 18' which is positioned to produce a pulse each time the forward edge of a row of image frames provided on the conveyor is adjacent the scanning axis of said photoelectric relay. That is to say, whenever an image frame starts to move into the scanning field of the scanner 14, a position indicating pulse is produced by means of the relay 17*f* and said pulse is operative to trigger the deflection chain of the video scanner and to cause said scanner thereafter to scan the selected image field and produce a picture signal on the output 15 of said scanner.

In a preferred arrangement, a photoelectric scanner 17*f* is provided for each row of said video scanners 14 and its output is connected to the input 99 of each scanner in said row, for triggering the scanning beams thereof. This embodiment requires that all document recordings in each row are laterally aligned with the row of cameras scanning means provided for each scanner 14. If each row of cameras is triggered by a respective scanner 17*f*, precise longitudinal alignment of the rows is not necessary if the position indicating marks or code on the border of 18' are aligned with respective rows of said image frames.

In accordance with the arrangement of FIG. 2, the scanner 14 is provided with three outputs 15*a*, 15*b*, and 15*c*, which respectively pass the horizontal and vertical sync signals and the corresponding picture signal to the switching system 13 through which said signals are gated to the monitor station or stations connected thereto.

Figures 3, 4, 5:
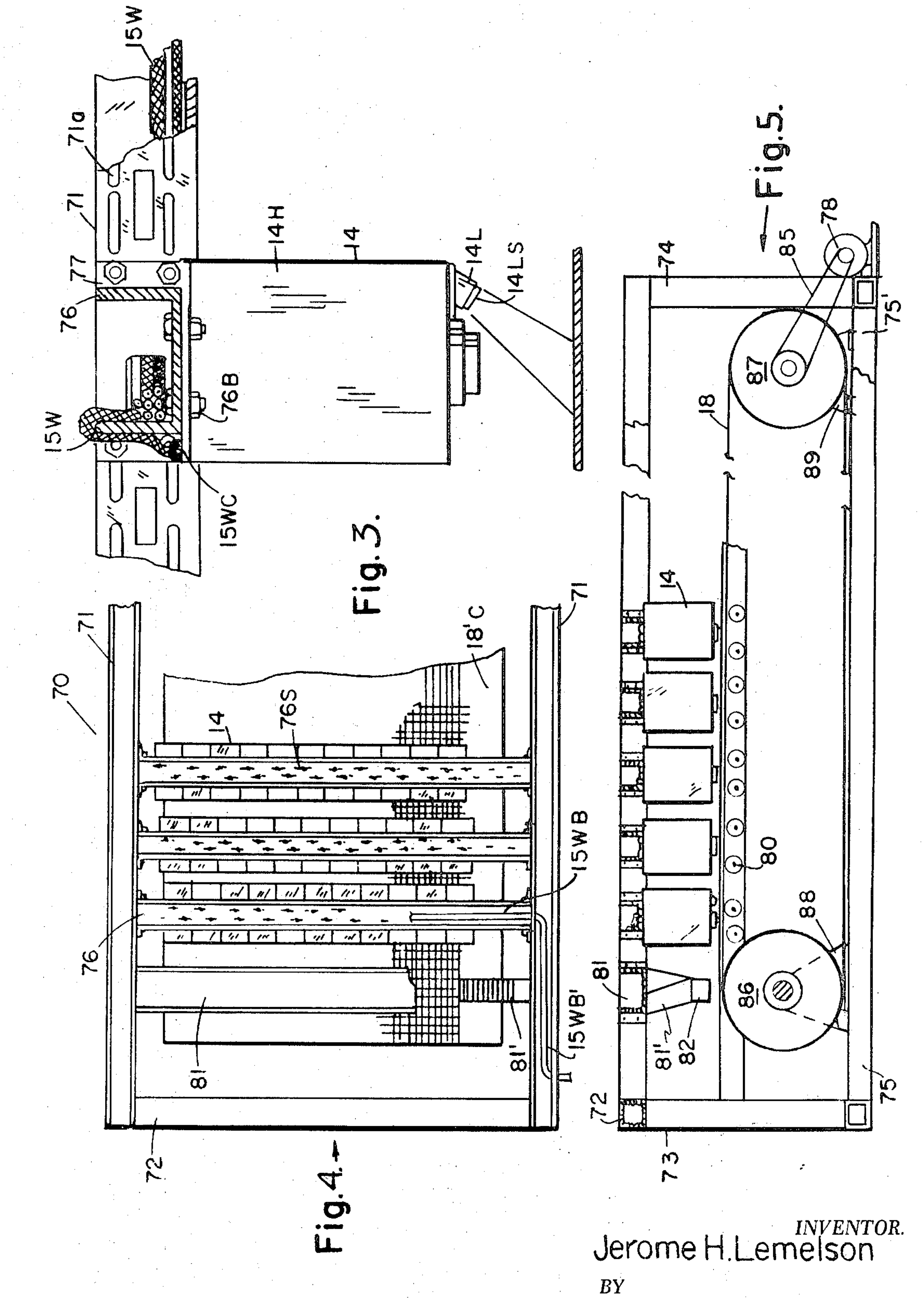
FIG. 3 is a partial plan view of storage apparatus and shows means for mounting a plurality of video cameras thereon relative to a movable storage conveyor in accordance with the teachings of this invention.
FIG. 4 is a partly sectioned side view of FIG. 3.
FIG. 5 is a side view of a video camera and its mounting means which may be utilized as part of the apparatus of FIGS. 1 to 3 for scanning the storage system thereof.
Figure 6:
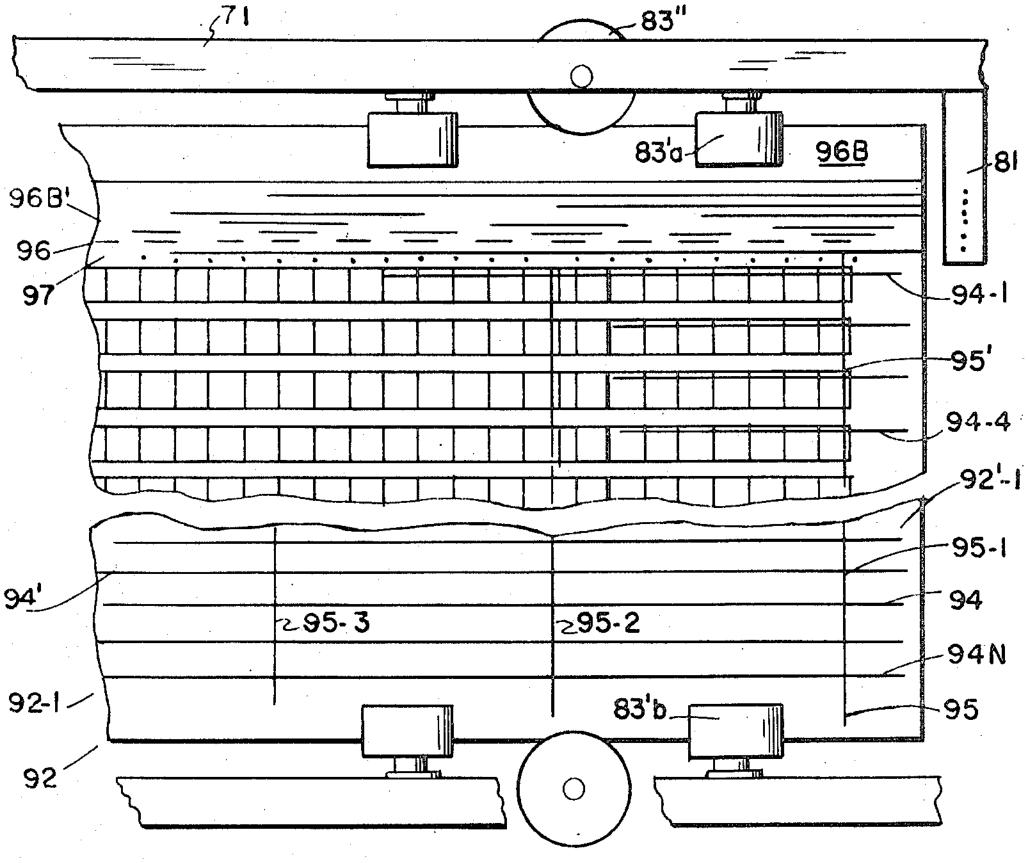
FIG. 6 is a partial plan view of a modified form of the conveyor illustrated in FIGS. 4 and 5.

The picture signal forming means of FIG. 5 may be utilized in a system comprising intermittent motion of the image frame conveyor 18 past the scanning cameras, by utilizing the feedback pulse generated by relay 17*f* to trigger the deflection chain of the camera at a time while the conveyor is at a standstill. Notation 17*fd* refers to a time delay relay in the feedback circuit 17*fw* which delays the output of 17-*f* a sufficient period of time to permit the conveyor to come to rest during its intermittent motion past the camera. A system employing continuous motion of the conveyor belt or flight 18' may also be utilized if the camera 14 is on a movable mount and is moved by means of a lineal servo so that its speed relative to 18' is essentially constant during the interval scanning occurs. The actuation of said camera moving servo may be effected by means of the pulse generated directly on the output of 17*f* before it has passed through said time delay relay. If intermittent motion of the conveyor 18 is employed, the relay 17*f* may be replaced by a limit switch which is coupled to the drive for said conveyor in a manner such that it becomes actuated each time intermittent motion occurs and it is merely necessary to adjust the time delay relay such that the pulse signal created at the output thereof will be transmitted to trigger the deflection chain to 14*g* and 14*c* at the proper instant. The picture signal resulting from such frame scanning is developed on the output of video amplifier 14*h* and with the output of blanking amplifier 14*f* is transmitted on the circuits of the automatic switching system to one or more of the monitor stations 22. The photoelectric relay 17*f* is operative to provide a control pulse each time it scans a mark spot 97 printed or otherwise provided on conveyor 18' adjacent each frame and indicative of the position of said frame. Said markers are illustrated in FIG. 6 as being adjacent the beginning of each frame row.

Also illustrated in FIG. 2 are details of a typical station video monitor. Station 22-*x* is illustrated having a video picture or storage tube 22', the picture writing means of which is operatively connectable either directly to the outputs 15 of the video camera 14 or to the intermediate storage apparatus which, in turn, is connectable to said camera outputs through said automatic switching system 13. The circuits 15*a*, 15*b* and 15*c* extend by means of connecting circuits in automatic switching system 13 to monitor station input circuits 15*a'*, 15*b'* and 15*c'* after passing through respective gates represented by the block 13', which gates are activated by signals provided by a code matching means which is part of the frame and circuit selection apparatus. The selected picture signals arriving on circuits 15*a'*, 15*b'* and 15*c'* are recorded on respective tracks of the magnetic recording member comprising the intermediate storage apparatus 20 and may be selectively reproduced therefrom a frame at a time for providing respective images on the face of the tube 22*x* as described in my U.S. Pat. No. 3,051,777.

It is noted that the camera 14 of FIG. 2 may be a flying spot scanner or other type of beam modulate video scanner. If said scanner is a flying spot scanner, the photoelectric receiver for the modulated light thereof may be positioned on the other side of the conveyor flight or belt 18' from the light source in alignment with the stored image frames F developed in transparent film. The output of the receiver, which may comprise a photo-multiplier tube will comprise picture signal line 15*c* while the vertical and horizontal sync signals are derived from the sweep and blanking unit controlling the beam of the scanner in its raster scan as described.

It is further noted that the apparatus of FIG. 2 may be simplified by providing a common sync and blanking unit such as 14SB adapted to generate vertical and horizontal sync signals as well as blanking signals for a plurality of scanning cameras such as all of the scanners provided in one of the lateral arrays or may provide beam deflection signals for all of the cameras in the system by providing the outputs of the vertical synchronizing signal amplifier 14*g*, the blanking amplifier 14*f* and the horizontal synchronizing amplifier 14*d* of a sweep and blanking unit operatively connectable to the inputs of all selectively operating cameras in the storage and reproduction system. All camera scanning beams will thus operate in synchronization with each other and each camera will produce a picture signal on its output at substantially the same time the other cameras are generating picture signals. This will require that all stored image frames provided in lateral array be aligned such that each will simultaneously enter the scanning fields of a respective camera in said lateral array of scanners. Longitudinal alignment of all rows as well as their spacing relative to each other will necessarily be the same for all rows of document recordings in such an arrangement. A single scanner such as 17*f* may thus be used to trigger the deflection chain of the common sweep and blanking signal generator. If intermittent drive is employed for the conveyor, the trigger signal may be derived from a limit switch on the shaft of the drive adapted to close and generate said trigger pulse when the conveyor comes to rest.

FIGS. 3 to 5 show constructional details of the image frame storage conveyor and the means supporting said plural rows of video scanning cameras. The housings of the video cameras are shown secured in side-wise abutment with each other in row formations with each row of said cameras being supported by a respective crossbeam 76 provided in the form of a channel which is supported between longitudinal beams 71 and 71' forming the upper structure of a box frame 70 which extends to the side of and above the closed loop conveyor 18. The box frame illustrated is made of pairs of end vertical beams 73 and 74, a pair of lower longitudinal beams 75 which are supported by the floor, upper longitudinals 71 and 71' and respective lateral beams, one of which 72 is shown in FIG. 6. Since a smaller television camera available at this writing measures about 1½ × 1½ inches in cross-section, in order to obtain maximum image frame storage density on the conveyor to provide scanning axes less than one-half inch apart, the requisite camera spacing is provided in FIGS. 6 and 7 by providing multiple rows of cameras and staggering the positions of the cameras in one row with respect to those of the other rows. If the walls of all camera housings are of the same dimensions and the optical systems of each camera is similarly provided in position in all cameras, then the distance between each camera's scanning axis, when said housings are in abutment with each other, will be equivalent to the width of the housing. As an example, if the camera housings are 2 inches wide and the distance between center lines of each column of storage frames or images on the conveyor 18' is three-eighths inch, then each camera in a bank will scan a column of image frames which is eight columns away from the column scanned by the adjacent cameras. By staggering each row of cameras so that it is shifted in lateral position from the adjacent or next row in line a distance equivalent to the distance between columns of image frames, then eight rows of said cameras, each of which extends completely across the image area of the conveyor, will suffice to scan all columns of image frames on the surface of the belt 18.

Further structural details of the mount for said cameras include the provision of means for supporting such components as bearings for the shafts of the conveyor drive and idler means, the drives for said conveyor and the coaxial cable and wires extending to the individual cameras. The longitudinal and lateral beams 71, 72 and 76 are provided as I-beams or channels opening upward as shown so that said cable, referred to by the notation 15-W, may be placed in the track or channel provided by said beams and will be supported thereby in extending to the various connection points along the lateral beams where they are connected to respective cameras. The wire bundle 15WB of each channel extend to longitudinal channel 71' where it joins and extends with bundles of other wires from cameras of other rows and forms a larger bundle 15WB' which extends along 71' to near one end thereof from which it extends to said automatic switching system or as individual wires to respective remote locations or monitor stations. The lateral beam 81 supports the described bank of code scanning photomultiplier tubes 82 which scan the border area 18'C of said conveyor containing said position indicating code. The drums 86 and 87 are shown respectively supported on bearing mounts 88 and 89 which are supported by extensions of the frame 70 or by the longitudinal beams 75 and 75' thereof at the bottom of the frame. The drum or sprocket 87 is driven by a motor 78 mounted on the end of the frame 70 through a belt 85. A plurality of free wheeling rollers 80 are supported in bearings at the ends by respective longitudinal beams, one of which 83 is shown, which extend between end verticals of the frame. These rollers support the belt 18' of the conveyor in precise vertical alignment relative to the cameras so that the image frames will not be out of focus when projected on the scanning screens of the cameras.

In order to permit lateral adjustment of each camera, the base of each channel 76, against which the end of each camera is mounted by means of screws, is provided with a series of slotted holes 76S therein which extend in at least two rows along the length of each channel. If the length of each of said slotted holes 76S is equal to or greater than half the width of each camera housing, then the desired lateral adjustment of all rows may be effected and said beams may be interchangeable with each other. If an individual camera should have its circuit components burn out, it may be easily removed and replaced by another camera by making the connections between the wires 15W and said cameras pluggably connectable with each other.

FIG. 5 shows further details of a camera and mount in the system illustrated in FIGS. 3 and 4. Secured at both ends of the longitudinal upper beams 71 and 71' of the frame is a lateral channel beam 76 which is provided with angle brackets 77 at both ends, which are secured by bolts to the upper beams of frame 70. Slots **71*a*, provided in the inner sidewall of box or channel beam 71, permit longitudinal adjustment of the crossbeam 76. Such elongated slots preferably extend the length of the lateral beams. Centrally located slots 71*c* in the inside wall of 71 permit the passage of the wires and video cables therethrough from the interior of the beam 71 to the interior of the cross-channel 76 and the extension of said wires to their respective cameras and controls. The cable 15W, extending along channel 76, may be strapped to the sidewall thereof or merely deposited therein. Said cable is shown extending over the edge of the sidewall of 76 from which it extends downward to the top of the camera housing 14H. The cable 15W is preferably connected to the camera by means of a multiple pole pluggable connector 15WC, one half of which is secured to the end of 15W and is adapted to plug into a recepticle secured to the housing so that said camera may be easily removed and disconnected, and replaced by another camera in the event that it should not function properly. All that is required to replace the camera is to remove bolts 76B which extend through the base of 76 and thread into threaded holes in the top wall of the camera housing 14H which abuts 76 as illustrated, and to disconnect the pluggable connector 15WC.**

Also illustrated in FIG. 5 is a light source 14LS in the form of an electric light mounted in a housing 14L at the side of the scanning aperture or lens 14-0 for said camera. A lens or lens system employed in the housing 14L preferably directs light to illuminate the column being scanned sufficiently to derive the desired degree of illumination for proper scanning.

Figure 7:
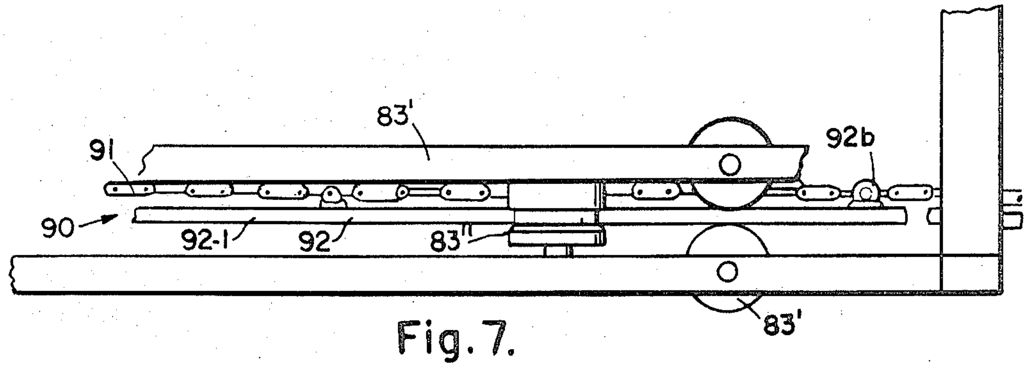
FIG. 7 is a side view of FIG. 6.

FIGS. 6 and 7 illustrate design details of a conveyor for the storage frames. Said frames may be mounted on or be part of a flexible conveyor belt or belt-like closed loop structure which may also comprise a plurality of flights 92 or plates arranged in a closed loop or otherwise, referred to as 90.

In FIG. 6, a fragment of a plate or flight 92-1 is shown and is preferably made of metal of sufficient stiffness to prevent its deformation during conveyance past the cameras. The edge view of FIG. 6, provided in FIG. 7, shows plural brackets **92*b* secured to the opposite face of the flight. Said brackets are pinned to a closed loop link or chain conveyor 91, which conveys the plates in a tandem array and along a fixed path in a plane at essentially a fixed distance from all cameras. The member 92** may also comprise a closed loop of one-sixteenth to one-fortieth inch thick sheet metal such as stainless steel adapted to be driven around a plurality of guides or pulleys.

A first border area 96B of the flight 92-1 is adapted to be engaged by plural rollers or guides **83'*a* which are rotationally mounted on the frame adjacent the conveyor and urge said flight against rollers or guides 83'*b* engaging the other face of the flight preferably in alignment with said opposite face-engaging rollers. These rollers maintain the flight in the desired plane. Lateral alignment of the flight is effected by means of edge riding rollers 83''** which engage both lateral edges of the flight as it is drawn along by means of the chain which is driven and guided by conventional means over a plurality of pulleys or drums in a closed loop path.

The edge view, FIG. 7, shows the lateral guide rollers 83'', as being centrally recessed so that the plate rides in said recess and becomes centered and fixed in position relative to said guide members positioning the image frames thereon in predetermined longitudinal alignment relative the respective video scanners.

All rollers are preferably spring loaded against the plate or flight so that the flight is effectively guided and is kept in lateral alignment as well as substantially level and at the same height as other flights guided therethrough. Inward of the border area 96B of the plate is a strip area 96B' which extends the length of the plate and has provided thereon by means of printing, scribing or other means, an elongated code strip 96 such as a binary-code provided for positional indication of frame or frame row or lengths of said conveyor adapted to be scanned. The code on strip portion 96 is divided into and changes at fixed intervals of length of said conveyor which may comprise the length of each frame or a fraction thereof to allow for cross referencing information to be entered as parallel codes.

Inward of the code strip-area 96 are provided a plurality of marks or indentations in the surface of said plate in the form of laterally extending straight lines 95, which are precisely provided at right angles to plural longitudinal lines 94 for aligning strips or columnar formations of frames of image information which are provided on film, paper, plastic mounted per se or on a metal backing sheet. Said frames, for maximum conveyor area utilization, are preferably in the form of micro-image photographs having an area of less than one-half square inch each or less. Depending on the precision of the optical systems of the cameras and the resolution required of the reproduced image, strip areas or frame reductions from standard letter size sheets or photographs to recording areas which are one-tenth inch square or less per document may be employed. Lines 95' provided on the border of each frame are adapted for alignment with lines 95-1 to 95N on the conveyor 92 which extend laterally thereon and longitudinally extending lines 94' along one border of the image strip or frames are adapted to be aligned with the longitudinal conveyor lines 94-1 to 94-N to align said frames.

Whereas in FIG. 6 the notation 92-1 refers to a plate or flight which is shown in FIG. 7 as being secured with others to a conveyor chain and driven through the guide means by driving said chain, it is noted that said plate or sheet may be one of a plurality of individual plates or sheets which are not joined together but are individually handled and fed through the illustrated guide means and driven therethrough by motor means driving two or more of said illustrated pairs of guide rollers.

A plurality of parallel lines, referred to by the notations 94-1 to 94-N may be scribed or otherwise provided on the surface of the conveyor and extend in a longitudinal direction thereon for longitudinal alignment of image frames, columns of said frames or ribbon-like formations of multiples of said columns by aligning border lines or marks provided on said frames by printing or photography means. When said alignment is effected, the associated column or columns each are positioned to pass through essentially the center of the scanning field of their respective scanning cameras. Lateral alignment of each frame is provided by means of parallel extending lateral lines 95-1, 95-2, etc., provided across the flight 92-1 with which lines or marks each frame or strip-group of said frames are adapted to be aligned and are positioned in the longitudinal direction such that, when frames or strips have their position indicating marks aligned therewith, said frames will each be centered in the scanning fields of their respective cameras after they enter said field and the conveyor comes to rest for performance of the said scanning function. For continuous operation of the conveyor in which continuous line scanning is employed with the constant-speed movement of the vertical deflection means for said scanning, the alignment lines 95 serve to position rows of said frames relative the border code-strip 96 whereby each unit length of said code will be associated with a particular row of frames and to furthermore effect the alignment of said frames in lateral rows across said conveyor.

The flight 92-1 may be one of a plurality of said flights 92 which are hinged or otherwise pivotally mounted relative each other, preferably provided on a chain mount and drive means as shown and arranged in an open or closed loop adapted to move said plates at constant speed or intermittently at a constant rate with frames in respective columns simultaneously entering and leaving the scanning fields of respective of said scanning cameras or the like as described. The notation 92'-1 refers to that portion of flight or plate 92-1 which does not have said columns of image frames or pictures mounted thereon and illustrates the lateral and longitudinal extensions of the lines 94 and 95. The lateral lines 95 are shown provided every plural number of frame lengths along 92-1 although they may be provided and repeat every frame position thereon. The notations 97 refers to the described frame indicating marks which are adapted to be scanned and provide read-beam trigger pulse output signals by activating a photoelectric scanner, for frame start-reading trigger functions as described.

FIGS. 8 to 12 illustrate constructional details of the image frame conveyor flight 92 including means for simplifying the alignment of image frames thereon in column and row formations. The image frames are shown as provided as single units although they may also include strips of single or multiple columns of said frames which are prepared, preferably by photographic or printing means and are secured to predetermined areas of the conveyor so that automatic selection means may be employed for scanning selected recordings.

Figure 8:
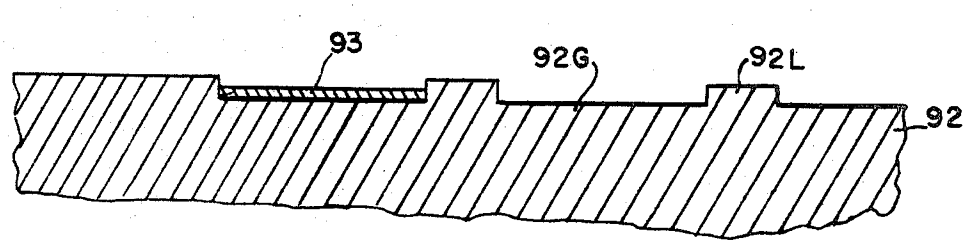
FIG. 8 is a partial view in lateral cross-section of part of the image frame conveyor of either FIG. 5 or FIG. 6 showing means for mounting a plurality of image frames thereon.

In one form, the conveyor flight comprises a flat rigid plate having frame position indicating lines scribed or otherwise provided on the surface thereof on which said image frames are to be secured to provide alignment and prepositioning of said frames. A flexible belt is utilized for said conveyor; the belt may comprise stainless steel sheet metal having frame alignment marks provided on its surface as described. In FIG. 8, the flight or plate 92, shown in lateral cross-section has a plurality of parallel extending grooves or channels 92G provided by milling or other means in the upper surface of said plate, each of which channels is approximately equal in width to the width of a single film-strip of image frames or to multiple columns of frames. The walls of the grooves thus serve as means for aligning strips therein which may be adhesively retained or secured with small screws to the bottoms of the grooves. Lands 92L are provided separating adjacent grooves and preferably run the length of the flight or a sufficient portion thereof to afford wall portions for alignment of said frame strips 93.

Figure 9:
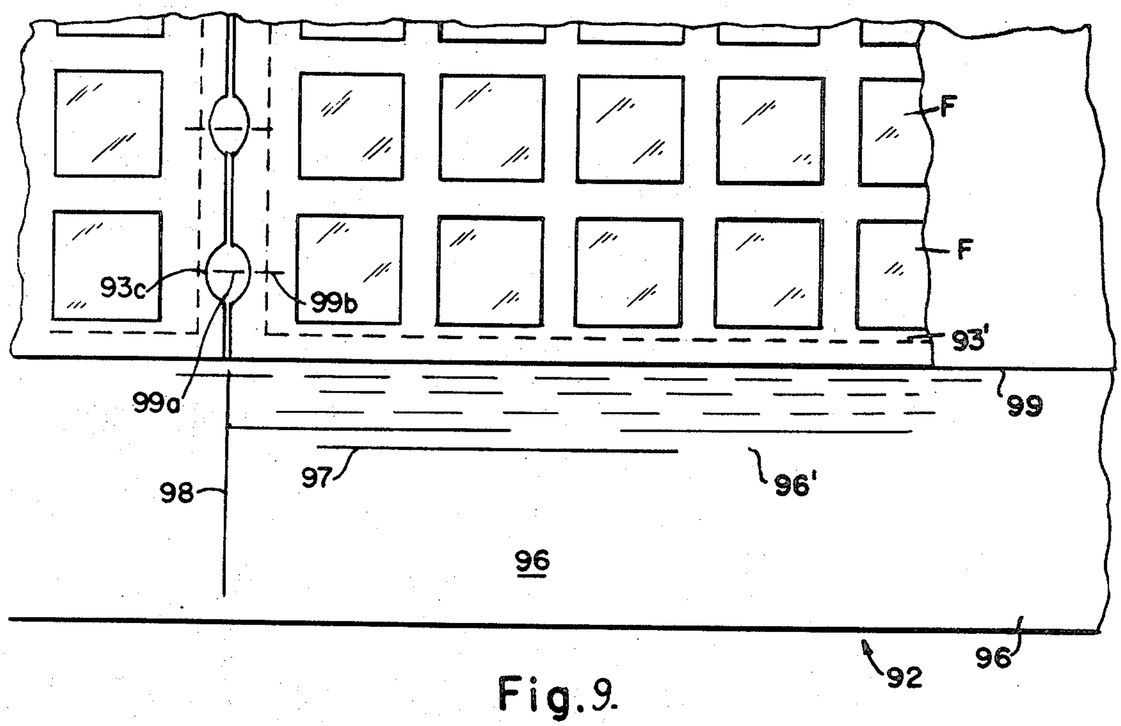
FIG. 9 is a plan view of a modified image frame mount or conveyor.
Figure 10:
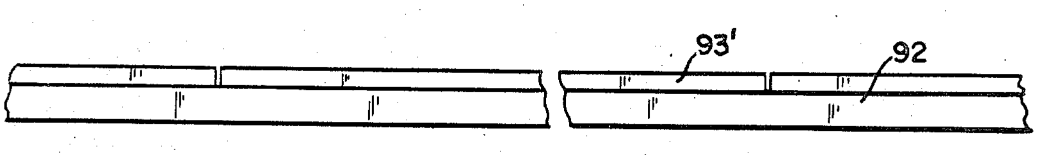
FIG. 10 is a side view of FIG. 9.

In FIG. 9, the sheet 93' contains the document recordings as plural columns F of photographic images developed in single strips of film. The choice of whether to utilize single columns of recordings or multiple columns will depend on the characteristic of the information being stored, how often it will have to be updated, replaced or changed and the characteristics of the selection and coding system employed.

Image frame alignment means in FIG. 9 comprises utilization of lateral lines 98 across the flight member 96 to define the location of the lateral edges of image frames F and plural longitudinally extending lines 99 and 99*a* scribed or otherwise provided on the surface of 92 for indicating the longitudinal alignment of columns of said image frames. Line 99, if the edges or borders of the film strips are precisely provided relative to the frames thereof, may be used during mounting or image development to align said strips laterally on 92. If film strips containing single columns of said frames are to be mounted or otherwise provided on the base, position indicating lines 99*a* spaced across the base and defining the center lines of the fields scanned by the scanning cameras, may be provided for automatic or manual alignment of film strip with lines 99*b* provided at the center of each image column or filmstrip. The notation 93*c* refers to a cutout in the edge of the filmstrips permitting the line 99*a* to be scanned or viewed from above. If the film strip is a transparent sheet of photographic film, said cutout will not be necessary.

Lateral alignment of a plurality of said film or image strips may be facilitated by providing said lateral alignment lines 98 also on the surfaces of each land portion 92L so that individual strips placed in the adjacent grooves may be aligned without having to use a straight edge. Notation 96 refers to the border area of the plate 92 which is flat and contains printed, photographic or otherwise provided marks thereon in the form of a strip code 96' extending as code increments along the length of said flight for identifying unit incremental lengths thereof on which specific rows of said frames are provided and for cross-indexing. Area 96 may also contain magnetic recording material to be recorded on and reproduced from by transducing means positioned off the conveyor.

Figure 11:
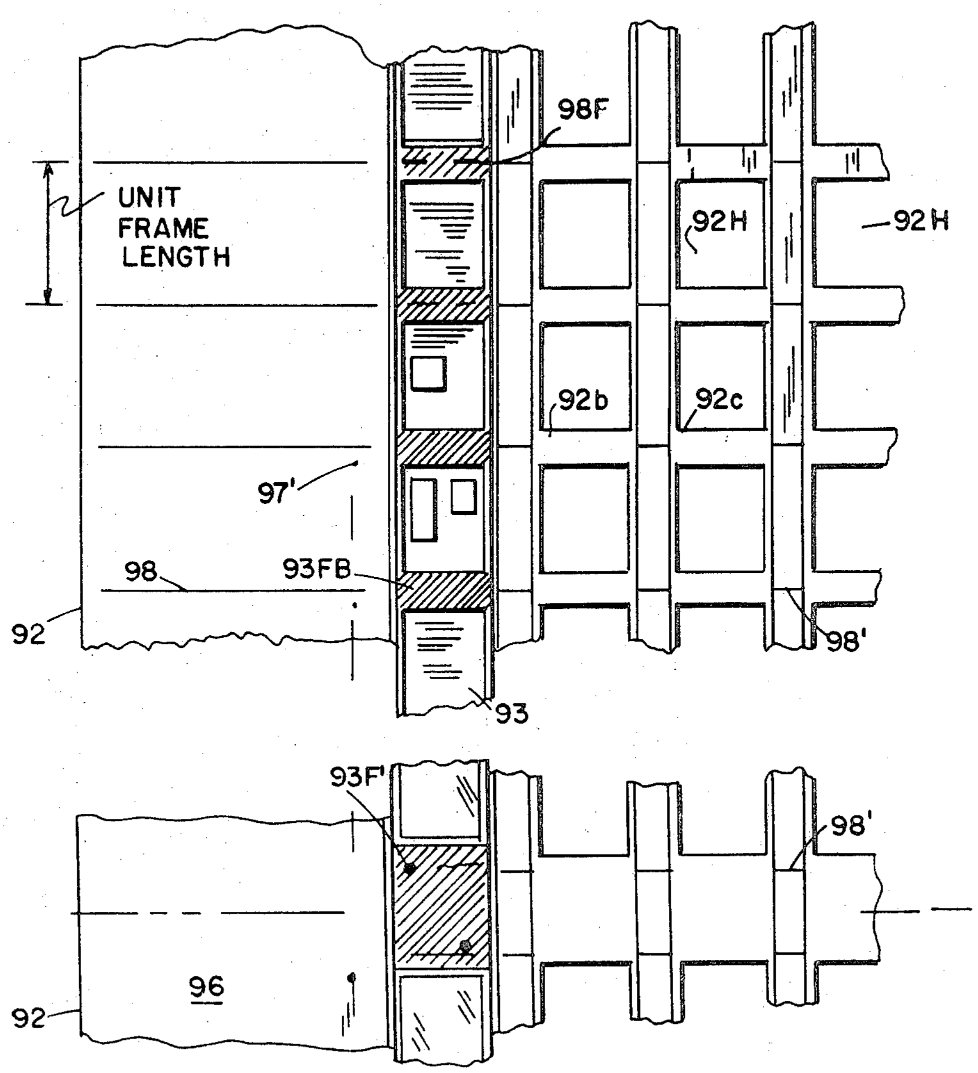
FIG. 11 is a partial plan view of another form of image frame conveyor and mount.
Figure 12:
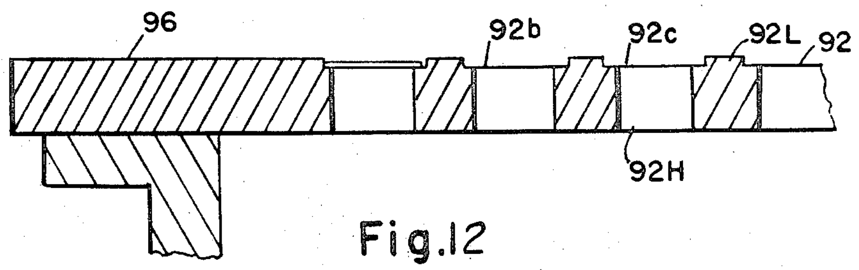
FIG. 12 is a lateral cross-sectional view of FIG. 11.

FIGS. 11 and 12 illustrate constructional details of a conveyor for said image frames which are mounted thereon in strips of one or more columns of said frames such as the strip 93 shown. The conveyor or platen 92 is shown as having a series of indentations or channels 92*a*, 92*b*, etc., provided in its scanned surface into which strips of film or micro-image developed transparencies are placed and secured. The width of each channel is essentially equal to the width of the film to be mounted therein so that the sidewalls thereof may serve as guides for aligning said strips. A plurality of slotted holes or cutouts 92H are provided in each channel base, if it is desired to pass light through the film for scanning purposes. Although the holes 92H illustrated in FIG. 11 are shown as extending just the length of each image frame, they may also be provided extending multiples of said frame lengths. Light may thus be passed completely through said film from below or above in the manner described hereafter. Scanning is effected by means of a flying spot scanner or the combination of a stationary light source on one side of the conveyor and the use of a receiver or camera on the other having its scanning means in alignment with said light source and said column. The lands 92L between channels provide the lateral wall support for the strips of image bearing film. The upper surface of each land is shown with a scribed line or mark 98' thereon for aligning the frames of said film. Alignment marks 98F between frames in a strip which define the end-limits of each frame are adapted to be aligned with the lines 98' when said image frame is properly mounted or recorded thereon. Cement may be applied to the base portions remaining between cutouts 92H for adhering the film strips thereto. Frictional means or small screw fasteners may be used to effect said holding function. The fragmentary view at the bottom of FIG. 11 shows portions 92b of greater length than the corresponding remaining portions 92*a* with fasteners 93F' securing the image strip 93 thereto. The lines 98 extending across the border code area 96 of flight 92 are extensions of the lines 98' and define the limits of the strip binary code units to be provided on 96. The notation 93FB refers to black portions of each film strip between frames adapted to be scanned and provide the blanking portion of the video signal. Notation 97' refers to marks along a particular track or strip area of 92 adapted to be scanned by a photoelectric device, such as 17*f* of FIG. 2, to provide the frame vertical sync pulse in the resulting picture signal and to trigger the vertical deflection chain of the camera as described. FIG. 12 shows further details of the flight construction and also illustrates a bracket 92*b* for supporting 92 on said conveyor therefor.

Whereas a number of the image frame flights or plates of FIGS. 8 to 12 may be secured together to define a conveyor having a flexible closed loop arrangement of flights in accordance with the assembly means of FIGS. 6 and 7, a plurality of said mounting plates may also be provided as the storage means for said frames, which plates are unattached and are stored by stacking either vertically or horizontally and fed, one at a time, either selectively or in a predetermined order through a guide means such as illustrated in FIGS. 6 and 7 which prepositions said plates and effects their prepositioning and individual alignment relative to one or more scanning cameras which are fixedly mounted relative said plate guiding means. The feed of said unattached plates may be effected by conventional sheet feed means to said guide means of FIGS. 6 and 7 whereafter the driving of each plate through said alignment means may be effected by the frictional engagement of one or more drive wheels against the undersurface of the plate adapted to be driven by a powered drive means or servo at a constant or intermittent movement as described.

Since all of said rollers are provided with opposed rolling depressor means and are spring loaded to frictionally engage the plate after it enters said guide means, the continuous or intermittent drive of said rollers by means of a chain and sprockets or by means of gears driven by a constant speed motor or stepping motor, will effect the continuous or intermittent drive of said plate. The drive will depend on the type of scanning and will be in accordance with the teachings of this application whereby individual rows of said frames will move into and out of the scanning fields of respective cameras as described. The plate or sheet 92 may be a sheet or card, with or without punchings provided therein for automatic sorting and selection purposes. Known methods of getting, feeding, collating, selecting and sorting punched cards may be employed to select, preposition and feed individual cards to said guide means and to receive, convey and store said cards therefrom. A further improvement involves providing the guide and drive rollers 83' having sprocket wheels secured thereto or as sprockets adapted to have their teeth engage in punchings provided equispaced on the borders of said cards for longitudinal alignment in said guide means and for driving each card therethrough whereby the individual frames will be respectively prepositioned in the scanning fields of respective cameras when scanning is effected. The spacing between border punchings or cutout engaged by said sprocket drive teeth may be equivalent to said unit frame length FL permitting said cutouts to be used for frame alignment purposes and simplifying the means for controlling the movement of said drive sprockets. A columnar area of said card may be provided for containing, in addition to said position indicating code or the like, or as a supplement thereto, rows of punchings in the form of a code or codes adapted for selection and storage of the card by conventional punched card sorting and selection means.

Figures 13, 14:
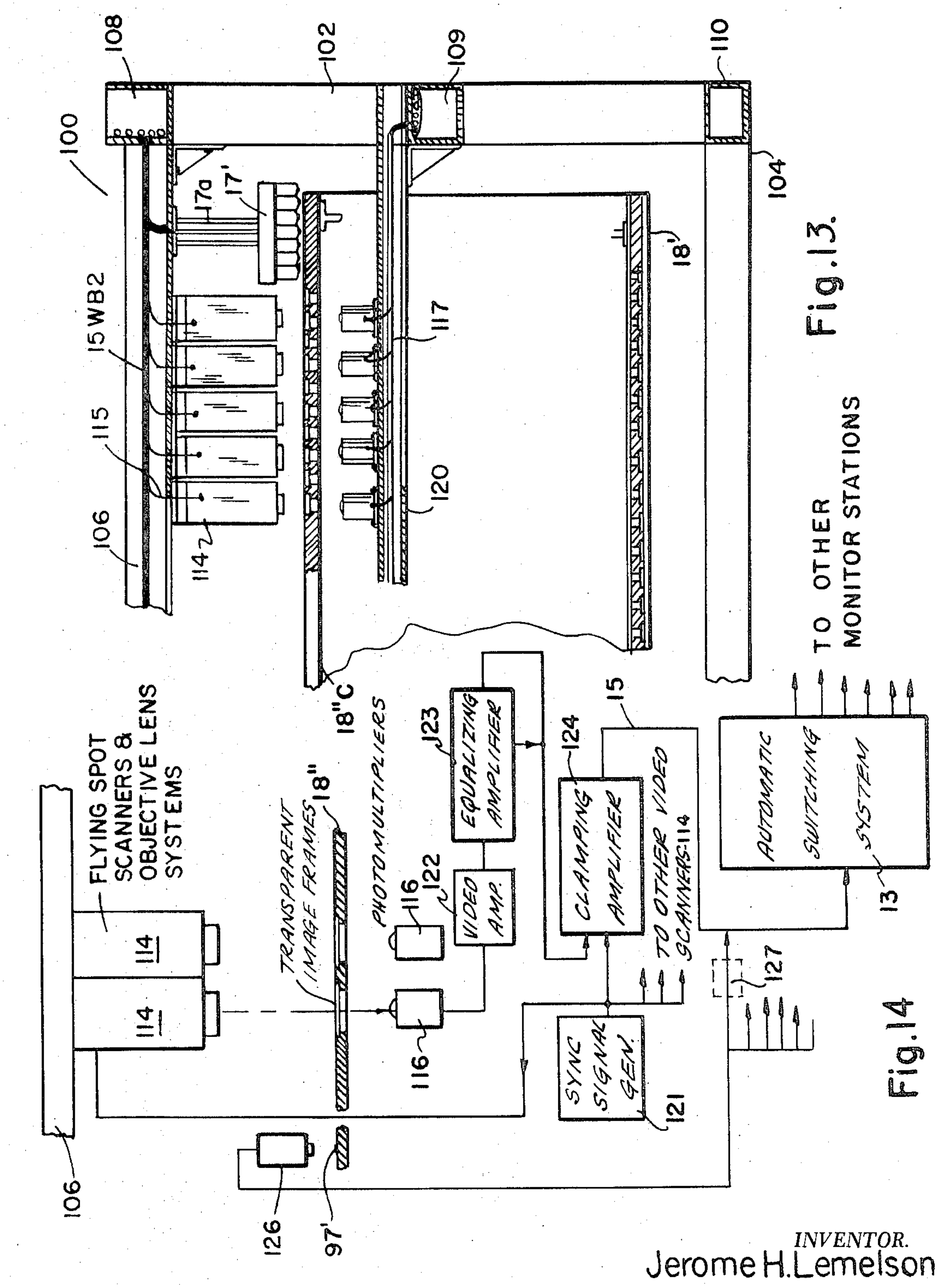
FIG. 13 is a partial view taken along a lateral plane of a modified scanner mount which is a modification of the mount illustrated in FIGS. 4 and 5.
FIG. 14 is a block diagram showing scanning and reproduction control means for the apparatus illustrated in FIG. 13.

FIGS. 13 and 14 illustrate further modifications to the image storage and picture signal reproduction apparatus hereinabove described and includes means for scanning image frames by means of reading beam movement across a column of said frames whereby scanning in the longitudinal direction is accomplished by constant speed movement of the image frame conveyor. In other words, the conveyor or flight on which document frames are mounted moves at constant speed while video scanning proceeds either with a free-running beam or one deriving line or frame sync pulses from scanning line or frame indicating marks along the border column of the conveyor. Said scanning provides a continuous picture signal of the image recordings which is actually a plurality of individual picture signals one for each frame scanned, and all generated in a tandem chain and derived from scanning the different image frames as they move relative to the scanning means. Only those selected individual picture signals which are predetermined portions of the resulting picture continuous signal derived from scanning the column of image frames are gated to the monitor stations in the system by the means described.

In FIGS. 13 and 14, conventional television cameras as heretofore described and used for scanning the document image fields, are replaced by a system employing a flying spot scanner of the cathode ray tube type which provides a moving light source projecting a beam of light through the transparent film images as they pass the scanner, said light being modulated in intensity as it passes through the transparent image fields and is picked up by a photomultiplier tube. The output of the photomultiplier tube is transmitted as a picture signal to the receiving station and stored or used at once to modulate the picture writing means at said station.

Notation 114 refers to a scanning device which includes a flying spot scanning tube and an objective lens system. Notation 116 refers to a housing containing a photomultiplier tube and a condenser lens system. The image storage system of FIGS. 13 and 14 includes, in addition to other features heretofore described for operating the conveyor and conducting the generated signals to monitor stations, at least one flying spot scanning unit such as 114 aligned with each image storage column of the constantly moving conveyor 18'' and an associated photomultiplier tube 116 positioned to receive light from said scanner after it has been intensity modulated in passing through the image frames passing between the two. A side-by-side array of said scanners is shown provided in a lateral row all of which are mounted on a common crossmember 106 which is supported by the described box-like frame of beams referred to in FIG. 13 by the notation 100. If the width of the image frames or columns of information is such that the closest spacing of said scanners 114 will provide scanning of only multiple frames or spaced-apart frames, staggered rows of scanners may be provided such as in the arrangement shown in FIG. 4, each row of scanners being provided on a different crossbeam 106 and aligned with a respective row of said photomultiplier receivers 116 provided below the conveyor flight 18''-c on respective crossbeams 120 which are supported by a longitudinal beam 109 at each side of the frame 100 which extend between vertical beams 102 located at the corners of said frame.

Power and deflection control lines 115 extend along each top crossbeam 106 to respective scanners 114. For effecting economy in construction of the illustrated apparatus, all or groups of the flying spot scanners may be collectively controlled whereby the deflection beams of each are simultaneously caused to scan their fields by signals generated in a common signal generator having an output which feeds the deflection circuits of all or a plurality of scanners. A block diagram of the picture signal generating means of such an arrangement is illustrated in FIG. 14. A single line deflection synchronizing signal generator 121 is provided having circuits similar to the horizontal scanning sync signal generator and line blanking signal generator used in conventional television horizontal and blanking sync signal generation. The generator 121 is shown feeding the deflection control circuit of the flying spot scanners 114 as well as the final stages of the picture signal amplifiers of each photomultiplier receiver 116 in a particular row of said scanners. The output of the photomultiplier tube 116 is proportional in amplitude to the intensity of the light received by said photomultiplier from its respective flying spot scanner after passing through the film of its respective column. Said output is passed to an equalizing amplifier 123, the output of which is fed to a clamping amplifier 124 wherein the respective horizontal sync signals are combined with the picture signal, the former being generated by the sync signal generator 121. The output of 124 is passed, as a series of picture signals derived from scanning respective frames as they pass through the field of their respective scanners and said picture signals are combined with blanking and horizontal sync signals and fed to the switching system 13 described. Means as heretofore described may be used for selectively gating only those portions of the picture signal generated by scanning selected frames of the column of document images conveyed past the selected scanner.

In operation of the apparatus of FIGS. 13 and 14, light from the illuminated spot on the face of the flying spot scanning tube is focused on the image in the film and is modulated passing therethrough according to the degree of transparency of the image being scanned. The modulated light is focused on the multiplier phototube by a condensing lens system and the output of 116 constitutes the video signal. Single line deflection is utilized with the circuits similar to horizontal scanning in conventional television and the beam is thereafter adapted to quickly return to a start scanning position after reaching the end of each line sweep, during which interval the beam is blanked. Reference is made to apparatus described in the March 1949 issue of RCA REVIEW for a description of a continuous sweep flying spot scanner operative to scan a continuously moving film-strip and applicable to the apparatus of FIGS. 13 and 14. Line frequency may be adjusted from 6 to 16 kilocycles and will depend on the speed of the conveyor 18'' and the desired degree of resolution of the resulting image generated on the face of the monitor screen.

If conventional video storage and reproduction apparatus are utilized to reproduce an image on the face of a cathode ray tube or the like by the means described in U.S. Pat. No. 3,051,777, both line and frame vertical sync signals will have to be added to the resulting picture signals generated by the photomultiplier tube 116 at some point after their generation or provided in the proper synchronized relation to the picture signal at some point in the system prior to its ultilization to modulate the beam writing means for monitoring the image of the picture signal. In FIG. 14, a photomultiplier tube, or the like, 126 is provided which scans marks 97' on the border of the conveyor 18'' and is adjusted to provide a signal output whenever a mark appears in the scanning field of said tube. If said marks or points or different light reflectivity are positioned such that the image of each will enter the scanning field of 126 when the leading edge of a respective image frame or row of frames enters the scanning field of a video camera or scanner 114, then the pulse output of 126 may be recorded as the frame vertical sync signal or used as means for triggering a vertical sync signal generator to provide future vertical deflection control for the selected picture signal. The output of 126 is shown connected to the output 15 of amplifier 124 for the signal generated by 116 as well as to the outputs of the amplifiers associated with the other photomultiplier tubes 116 of a row or all those in the storage system so that said sync signal is combined and transmitted with the video picture signal in correct synchronization such that it may be used as the frame vertical sync signal. The notation 127 refers to a vertical sync signal generator of conventional design which may be inserted between the output of 126 and the line 15 or all outputs for the photomultiplier tubes 116 of a row or system which generator is triggered by the signal produced by 126 and combined with the video signals to provide the necessary vertical sync signals for modulating conventional video beam writing means. Said generator 127 may also be provided at each video receiver or may be operative to provide frame vertical sync signals on all scanner output lines simultaneously. The notation 117 of FIG. 13 refers to the individual lines extending from each photomultiplier 116 along the beam support 120 to the longitudinal beam 109 from which all said lines extend to the described switching system. Similarly, the lines 115 extend along upper longitudinal beam 108 from a common power supply and sync signal generator to each flying spot scanner 114. Notation 17' refers to the mentioned bank of code reading photomultiplier tubes secured on a mount **17*a* to the crossbeam 106. Output lines thereof extend along 108** to respective inputs to the switching system.

The conveyor belt 18' may comprise an elongated magnetic recording medium such as a wide magnetic recording belt or a plurality of belts or tapes with picture signals recorded in columns and rows thereon onto predetermined strip areas thereof for selective reproduction by the means provided by use of a plurality of the correct reproduction transducers. Furthermore, the positional code producing photoelectric reading bank of relays 17 of FIGS. 1 and 14 may be replaced by one or more magnetic reproduction transducers adapted to scan one or more magnetic recording tracks provided on a magnetic recording strip area of the belt or flight on which is recorded a plurality of signals which are indicative of the position of the belt. The provision of a parallel binary code thereon adapted to be reproduced and provided in essentially the same areas as the illustrated visual code, would serve the same function as said visual code when magnetically reproduced therefrom.

A further variation in the means for scanning and storaging image signals may utilize the physical arrangement illustrated in FIG. 13 which employs document image frames developed in thermoplastic recording photographic film. Direct lighting and scanning of the image field may be employed as illustrated in FIGS. 2 and 3 in which the camera scan positive prints ripple pattern thermoplastic recordings or film mounted on a white background. If micro-images developed in photographic or thermoplastic recording film are employed, a preferable method for providing said images at the scanning plane of the cameras is to pass light through said film in a manner to project the images formed by said light onto the scanning field of the camera. In this arrangement, the housings 116 contain mounted thereon the required light sources and optical means for projecting said light whereby it passes through the column of images 93 and is then passed to the camera lens system whereby it forms an image on the scanning screen thereof. For this arrangement, the housings 116 would all be light sources and the scanners 114, video cameras having the necessary optical scanning means provided with each. The video picture signal outputs of said cameras would be connected as illustrated in one of the circuits heretofore described.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. Apparatus for reproducing picture information from a record medium comprising, in combination:

an elongated, narrow strip of thin, transparent material having formed thereon a sequence of picture information-containing frames and a sequence of synchronizing indicia associated with said frames, respectively;

means for transporting the strip through a scanning zone;

means for interrogating the frames and synchronizing indicia of the strip in a scanning zone including a scanning beam;

a horizontal scan signal generator productive of a periodic waveform signal at a given frequency for periodically sweeping the scanning beam across the record medium in the scanning zone in successive substantially superimposed line scans; and detector means responsive to the interrogating means for developing (a) a first signal representative of the information contained in the frames of the strip and (b) a vertical synchronizing signal at a frequency related to the rate of movement of the synchronizing indicia through the scanning zone but independent of the given frequency of the periodic waveform signal.

2. Apparatus as defined in claim 1, in which:

the synchronizing indicia are disposed on the strip between adjacent ones of the frames.

3. Apparatus according to claim 1, further comprising:

means for combining the first and vertical synchronizing signals and a further signal synchronized with the periodic waveform as a composite signal suitable for application to a television receiver for reproducing the picture information contained on the record medium at the desired frame rate.

4. Apparatus in accordance with claim 3, further comprising:

television receiver means responsive to the composite signal from the combining means and including means for generating a time sequence of visible television fields representing the sequence of frames on the strip, and means responsive to the vertical synchronizing signal and the initiation of the respective fields for controlling initiation of the field so as to maintain them in synchronism with the movement of the frames through the scanning zone.

5. Apparatus for reproducing picture information on a viewing screen from recordings thereof comprising:

electron beam scanning means for scanning an image field, conveying means for a plurality of image frames recorded on film, said conveying means being operative to sequentially carry each of said frames into the scanning field of said electron beam scanning means and to remove each frame from said field after it has been scanned by said scanning means, control signal generating means, servo means for intermittently driving said conveying means to bring each frame individually into the field of said electron beam scanning means and to stop said frame substantially centered in said field, control means for said servo means operatively connected to said control signal generating means and to become energized upon receiving a control signal therefrom to cause the movement of an image frame out of the scanning field of said electron beam scanning means and its replacement with a new image frame, monitor means including a cathode ray tube connected to receive picture signals from said electron beam scanning means and including means for generating images of the frames scanned by said scanning means, and means for automatically operating said control signal generating means to cause it to predeterminately generate control signals at predetermined time intervals so as to cause said servo means to intermittently operate at the end of each time interval in conveying image frames into and out of said image field for intermittently providing images of said frames on said means for generating images of said monitor means.

6. An apparatus in accordance with claim 5, said conveying means comprising motion picture filmstrip and transport means for said filmstrip, said electron beam scanning means operative to read said filmstrip image frames and generate video motion picture signals, said monitor means operative to receive said video signals and means for modulating the write beam of said cathode ray tube of said monitor means, said modulating means being operatively connected to receive said video signals and effect the generation of motion picture images on the screen of said monitor means.

7. An apparatus in accordance with claim 5, said image frames containing separate images of different phenomena and adapted to be separately viewed on the image screen of said monitor means, and means for retaining the image generated in scanning each image frame on the screen of said monitor means for an extended period of time.

8. Apparatus for generating picture information on a viewing screen from recordings thereof comprising:

radiation beam scanning means for scanning an image field, conveying means for a plurality of image frame recordings recorded tandemly on a record member, said conveying means being operative to sequentially carry each of said frame recordings into the scanning field of said beam scanning means and to remove each frame recording from said field after it has been scanned by said scanning means prior to presenting the next frame recording to said scanning field, servo means for intermittently driving said conveying means to bring each frame individually into the field of said beam scanning means and to stop said frame substantially centered in said field, control means for said servo means operable to cause intermittent movement of said conveying means for intermittently replacing one image frame with another in said scanning field, monitor means for generating viewable images of the information recorded on the frames scanned by said scanning means and means for generating control signals in synchronization with the movement of said conveying means and applying said signals to said control means for intermittently operating said servo means to intermittently drive said conveying means at the rate of said control signals are generated to cause the intermittent presentation of the information of the frames scanned to said monitor means.

9. An apparatus in accordance with claim 8 in which said control signal generating means is operable to generate control pulse signals at the rate of between 12 and 24 pulse signals per second.

10. An apparatus in accordance with claim 8 in which said servo means is a stepping motor.

11. Apparatus for reproducing picture information from a record medium and generating same on a viewing screen comprising:

a record member defining a record track with a sequence of picture information-containing frame recordings and a sequence of synchronizing indicia associated with said frame recordings respectively, means for transporting said record member to carry said frame recordings successively through a scanning zone, means for interrogating the frame recordings and synchronizing indicia of the record member with a scanning radiation beam, detector means responsive to the interrogating means for developing (a) a first signal representative of the information contained in the frame recordings of said record member and (b) a vertical synchronizing signal at a frequency related to the rate of movement of the synchronizing indicia through the scanning zone, a television receiver having a picture tube and a write-beam for generating images on the image writing screen of said picture tube, deflection means for said write-beam including means for horizontally deflecting the write-beam to scan respective horizontal lines of the image writing screen of said picture tube, and vertical deflection means for the beam, said first signal developed by said detector means having horizontal synchronizing signal components and line vertical deflection signal components, means for feeding said horizontal signal components and said line vertical deflection signal components to said deflection means of said receiver for causing the write-beam to scan successive horizontal lines of the image writing screen, and means for applying said vertical synchronizing signals generated by said detector means each time it interrogates a synchronizing indicia on said record member to said vertical deflection means of said picture tube to position the beam at a start-scan location from which it may thereafter full-frame scan the image writing screen of said picture tube.

12. Apparatus for reproducing picture information from a record medium and generating same on a viewing screen comprising:

a record member having a sequence of picture information-containing frame recordings and a sequence of synchronizing indicia associated with said frame recordings respectively, means for transporting said record member to carry said frame recordings successively through a scanning zone, means for interrogating the frame recordings and sychronizing indicia of the record member with a scanning radiation beam, detector means responsive to the interrogating means for developing (a) a first signal representative of the information contained in the frame recordings of said record member and (b) a synchronizing signal at a frequency related to the rate of movement of the synchronizing indicia through the scanning zone, a television receiver having an electro-optical viewing screen and modulating means for generating images on said viewing screen, means for controlling said modulating means to intermittently modulate said viewing screen with image information to permit the generation of motion picture phenomena, means responsive to said synchronizing signal for activating said modulating control means to initiate a screen modulating and image generating cycle whereby each time said synchronizing signal is generated by said detector means, a new image will be generated on said viewing screen.

13. Apparatus for reproducing picture information from a record medium comprising, in combination:

a record member made of transparent material having formed thereon a sequence of picture information-containing frames and a sequence of synchronizing indicia associated with said frames, respectively, means for transporting said record member frames through a scanning zone, means for interrogating the frames and synchronizing indicia of the record member in a scanning zone including a scanning beam, a horizontal scan signal generator productive of a periodic waveform signal at a given frequency for periodically sweeping the scanning beam across the record medium in the scanning zone in successive substantially superimposed line scans, and detector means responsive to the interrogating means for developing (a) a first signal representative of the information contained in the frames of the strip and (b) a vertical synchronizing signal at a frequency related to the rate of movement of the synchronizing indicia through the scanning zone but independent of the given frequency of the periodic waveform signal.

* * * * *